INVENTORS
EDWARD A. WOZNUK
& ROBERT J. BRETT
BY Oberlin + Limbach
ATTORNEYS.

Feb. 5, 1952 — E. A. WOZNUK ET AL — 2,584,776
MOLD FOR PRESSURE FORMING OF COMPOSITIONS
Filed April 22, 1947 — 2 SHEETS—SHEET 2
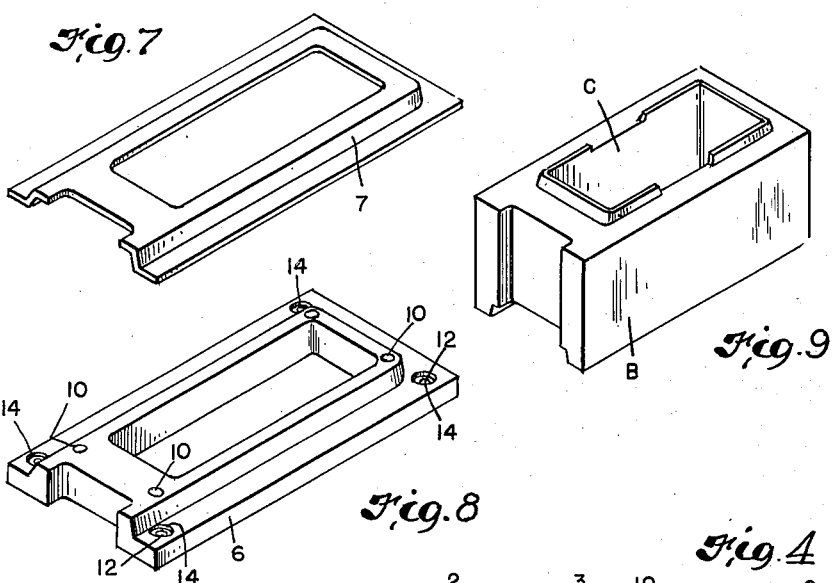
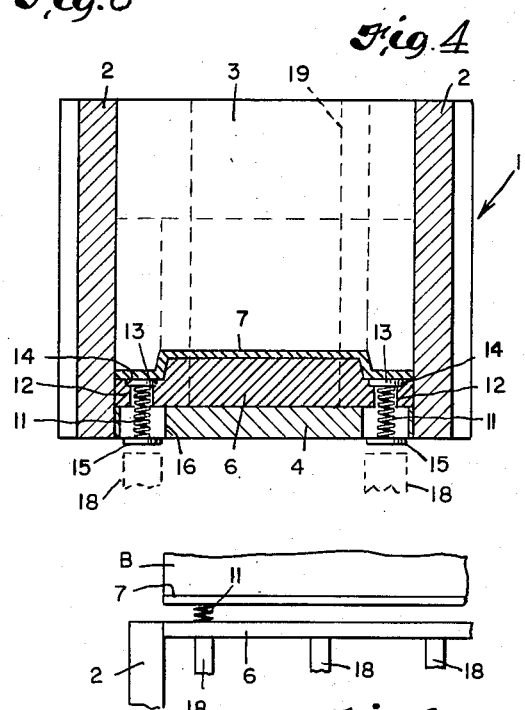
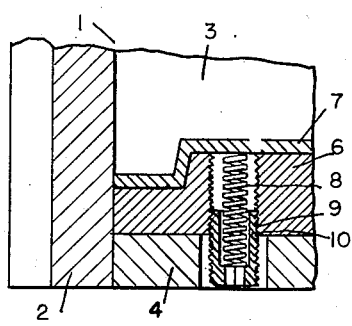
INVENTORS
EDWARD A. WOZNUK &
ROBERT J. BRETT
BY Oberlin + Limbach
ATTORNEYS.

Patented Feb. 5, 1952

2,584,776

UNITED STATES PATENT OFFICE 2,584,776

MOLD FOR PRESSURE FORMING OF COMPOSITIONS

Edward A. Woznuk and Robert J. Brett, Cleveland, Ohio

Application April 22, 1947, Serial No. 743,132

10 Claims. (Cl. 25—120)

This invention relates to molds and particularly to molds in which building blocks and like structural elements composed of aggregates and cementitious material, are pressure formed to shape under relatively high pressures.

The mold of the present invention is particularly adapted for the forming of accurately dimensioned building blocks of the interlocking type.

In the prior methods of manufacture of building blocks, employing relatively high forming pressures, a high degree of accuracy is unnecessary inasmuch as the blocks are to be bonded together subsequently by the usual mortar layers. In the case of interfitting blocks which are adapted to be bonded together by a superficial film of cementitious material, much greater accuracy and higher forming pressures are required. The combination of the higher pressures and extreme accuracy in their dimensions make it impractical to produce such blocks economically with the ordinary molds of the type heretofore used.

For example, the molds of the prior art generally employ a bottom pallet which, in case of high pressure molding of the usual size of building block, is of relatively heavy steel. The weight of the pallet for the conventional size block is approximately 30 pounds and it must be sufficiently rigid to withstand distortion and deflection at the pressures employed. After the molding operation, the bottom pallet is removed with the block superimposed thereon and the block and pallet are stored together until the block has cured.

This is particularly true in the case of blocks of which the base is configured for interlocking as in the above described application. This necessitates a large inventory of bottom pallets and extremely strong racks for supporting the combined weight of the pallets and blocks. Furthermore, it imposes upon the workman, the additional burden of carrying the pallet and the block together. In those cases wherein the blocks are made with a high degree of accuracy in all dimensions, the pressure required to form them in the mold and particularly the pressure required to remove the formed blocks from the mold necessarily must be considerably above that required for forming blocks where considerably less accuracy in dimensions is necessary.

One of the principal objects of the present invention is to provide a mold for the high pressure molding of loose materials into dense building blocks of extreme accuracy in dimensions.

A more specific object is to provide a mold for the purposes described which eliminates the necessity for a large number of heavy bottom pallets heretofore employed.

Another object is to provide a mold with a lost motion ejection means by which the block can be ejected from the top of the mold in a manner such that it can readily be removed for storage and curing.

Another object is to provide an adjustable means for adjusting the capacity of the mold in such manner that accurately measured amounts of aggregate material to be molded can be provided, depending upon the size of the block, merely by filling the mold and striking it off-level with the top surface and in which allowance can be made for the differences in degrees of compressibility of the material being molded.

Other objects and advantages will become apparent in the following description wherein reference is made to the drawings in which:

Fig. 4 is a vertical sectional view taken on line 4—4 of Fig. 2;

Fig. 5 is an enlarged fragmentary sectional view taken on line 5—5 of Fig. 2 and showing one of the capacity adjusting means of the mold;

Fig. 6 is a diagrammatic side elevation showing the relation of the mold and pallet thereof in the ejected position;

Fig. 7 is an isometric view of a pallet plate forming part of the present invention;

Fig. 8 is an isometric view of a master pallet, or bottom pallet, of the present invention, and Fig. 9 is an isometric view of a building block formed in the mold herein shown for purposes of illustration.

Figure 1:
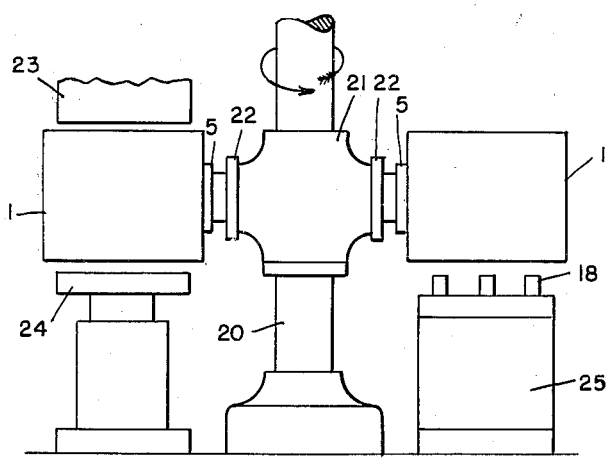
Fig. 1 is a diagrammatic side elevation of a molding machine with molds of the present invention in operating position thereon.
Figure 2:
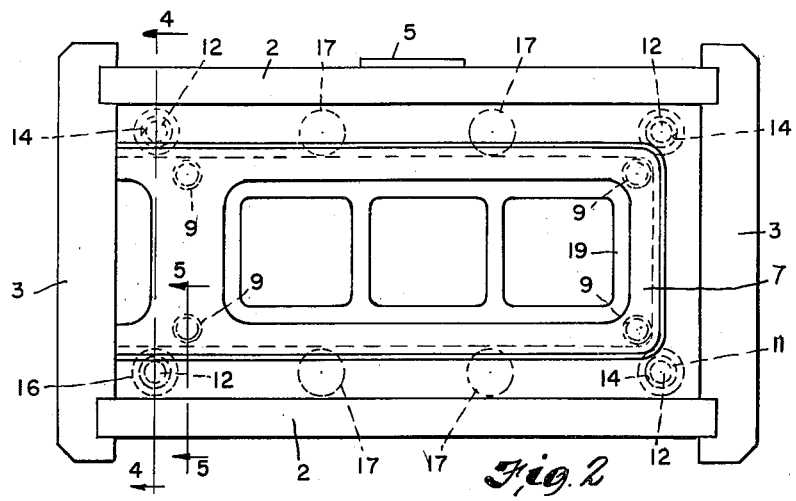
Fig. 2 is a top plan view of a mold embodying the principles of the present invention.
Figure 3:
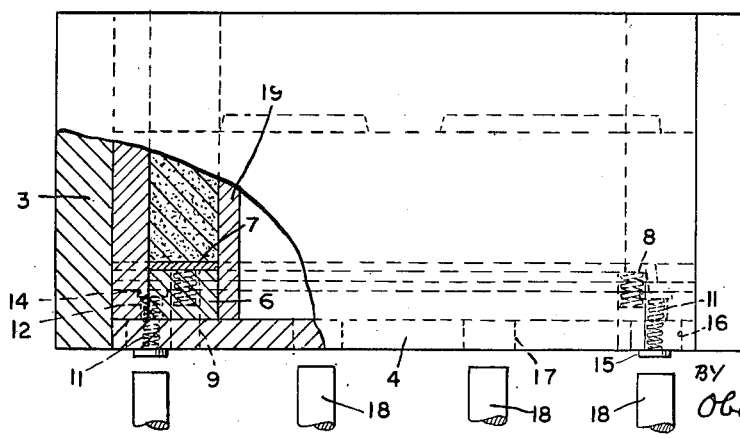
Fig. 3 is a side elevation of the mold illustrated in Fig. 2, part thereof being shown in section for clearness and illustration.

Referring to the drawings, the mold indicated generally at 1 comprises a rigid metal frame having side walls 2 and end walls 3 and a bottom wall 4. One of the side walls of the mold is provided with a trunnion engaging coupling 5 by which the mold can be supported upon the molding machine, as illustrated in Fig. 1. Mounted within the mold 1 so as to rest on the upper surface of the bottom wall 4 thereof is a master pallet 6, the undersurface of which is preferably flat so as to fit the top surface of the wall 4. Superposed upon the master pallet 6 is a pallet plate 7, the undersurface of which is congruent to and accurately fits the contour of the upper surface of the master pallet 6. In the form illustrated, the building block is one which has inset shoulders in the bottom edges of its side walls so arranged as to be capable of interlocking with cooperating bosses or flanges on the top edges of the side walls as is described more fully in said co-pending application.

Accordingly, the upper surface of the pallet plate 7 must be shaped to conform to the irregular contour of the undersurface of the block and therefore is non-planar. In order that the pallet plate 7 may be as light as possible, it preferably is formed of aluminum of uniform thickness with the result that both its upper surface and lower surface are contoured and the upper surface of the master pallet 6 is accordingly contoured to interfit with the contour of the undersurface of the pallet plate 7 throughout the entire extent of the undersurface of the pallet plate 7. The pallet plate 7 is made to extreme accuracy, as also are the internal dimensions of the mold cavity. For example, an allowance of not more than plus .005 of an inch tolerance in all vertical dimensions of the pallet plate is permitted. An allowance of not to exceed minus .005 of an inch tolerance is permitted in the lateral dimensions. In the case of the master pallet, the general tolerance of plus or minus .01 of an inch is permitted except as to its vertical dimensions which are held to a tolerance of plus or minus .002 of an inch.

As a result, when the pallet plate 7 and master pallet 6 are assembled in operating position, they provide a substantially unitary structure insofar as resisting the downward molding pressure is concerned and the pallet plate 7 is held rigidly in position and prevented from deflection or distortion throughout its entire extent by the master pallet 6. The weight of the pallet plate 7 is about two pounds as compared to the weight of thirty pounds for the plates heretofore used in high pressure molding.

Both the master pallet 6 and the pallet plate 7 are movable toward and away from the open top of the mold. Within the pallet plate 6 are a plurality of springs 8 which are received at their lower ends in hollow externally threaded bolts 9. The bolts 9 are threadably engaged with suitable threads 10 in the master pallet 6. The springs 8 bear against the underside of the pallet plates 7 and yieldably urge the pallet plate 7 upwardly away from the master pallet 6. By adjustment of the bolts 9, the pallet plate 7 can be yieldably supported in different elevated positions relative to the master pallet 6. By virtue of this adjustment, the volumetric capacity of the mold above the level of the pallet plate can be adjusted so that when the material mold is filled with loose material and the material is struck off level with the top of the mold, the required amount of material for a block of given height and wall thickness, remains. The springs 8 however are arranged to be compressed by the application of the molding pressure to such an extent that the pallet plate 7 is forced downwardly without deflection or distortion and comes to rest upon and is supported over its entire undersurface by the master pallet 6.

Since it is necessary for the molded blocks to be retained on a suitable support for curing after ejection from the mold, a lost motion ejection means is operatively interposed between the master pallet 6 and the pallet plate 7. In the form illustrated, the lost motion ejection means comprises a series of springs 11 arranged in upright position in suitable bores 12 in the master pallet 6 near its corners. Suitable buttons 13 are provided at the upper ends of the springs 11, respectively, and are arranged to be accommodated in counterbores 14 of the bores 12 so as to prevent the springs from dropping out of their associated bores 12 of the master pallet 6. At their lower ends, the springs 11 are provided with suitable buttons 15 which are arranged to be engaged by the knock-out pins of the press mechanism with which the mold is to be associated. The bottom wall 4 of the mold is provided with a plurality of bores 16 which are in alignment respectively with the bores 12 of the master pallet. The bottom wall 4 also is provided with a plurality of bores 17 which are offset from the bores 16 and are arranged to admit the upper ends of the knock-out pins into direct contact of the underside of the master pallet 6. The knock-out pins, indicated generally at 18, are of proper size to be moved axially upwardly through the bores 16 and 17. Those of the pins 18 which enter the bores 16, compress the springs 11 therein as the pins lift and continue compressing the springs 11 until engagement with the underside of the master pallet 6 is effected by those of the pins 18 which pass through the openings 17. Thereupon, the pallet 6 and the pallet plate 7 are lifted together toward the open end of the mold, the springs 11 remaining fully compressed and the pallet plate 7 resting firmly on the master pallet 6 during this part of the ejecting operation. The strength of the springs 11 is not sufficient, even when they are fully compressed, to lift the pallet plate 7 from the upper surface of the master pallet 6 against the resistance to such movement resulting from the engagement of the molded article with the side walls of the mold. However, when the master pallet 6 is thus raised to a position in which the article is clear of the side walls of the mold or, at least is near enough the top of the mold so that little resistance of the side walls to the upward movement of the article remains, the springs 11 expand and lift the pallet plate 7 and the article thereon relative to the master pallet 6 and above the level of the top of the mold a sufficient distance to permit the workman to reach between the pallet plate and master pallet and grip and lift the pallet plate 7 with the block supported thereon from the master pallet 6 and from the mold.

As mentioned, the vertical dimensions of the master pallet 6 must be extremely accurate as also must the vertical dimensions of the off-sets in the underside of the pallet plate 7 so that the entire undersurface of the pallet plate 7 is supported as otherwise it would be distorted by the molding pressure. Obviously, the dimensions of the mold and the position of the pallets therein likewise must be extremely accurate in order that the molded blocks will interfit with each other accurately enough to be bonded together by superficial cementitious films.

Referring to Fig. 9, a block B, for which the present mold particularly adapted, is illustrated, the use of the mold for other types of blocks being readily apparent therefrom. The central passage C through the block, is formed by a suitable metallic core 19 which likewise must be extremely accurate in all dimensions.

Some of the advantages of the mold with the master pallet 6 and pallet plate 7 and the lost motion ejection connection therebetween will be apparent from Fig. 1 wherein there is shown a molding machine of the usual type comprising an upright standard 20 with a vertically movable carriage 21 for the molds thereon. The carriage 21 is also rotatable about the upright axis of the support 20 and has diametrically opposite trunnions 22 arranged for cooperation with the trunnion couplings 5 of the molds 1, respectively.

A stationary platen 23 is arranged at one side of the standard 20 and is adapted to fit in the open top of a mold carried by the trunnion 22. Beneath and aligned with the platen 23 is a movable platen 24 adapted to engage the undersurface of the mold 1 and lift it into cooperative relation with the platen 20 to apply the molding pressure. Lifting of the mold 1 by the platen 24 also lifts the carriage 21. At the opposite side of the support 20 from the platen 23 is an ejection mechanism 25 which includes the ejection pins 18 heretofore described. The ejection pins 18 are adapted to be raised on the ejection stroke by suitable hydraulic means. The ejection mechanism 25 is so positioned that when one mold 1 is in cooperative relation with the platens 23 and 24, the other mold 1 is in proper alignment above the ejection pins. Thus one molded article can be ejected while the other is being molded and the ejection operation is preferably performed when the molds have been moved to a fully raised position by the platen 24.

After the ejecting operation, the carriage 21 is rotated one-quarter of a turn to position the empty mold in a position for receiving a charge of material. The material is poured into the mold and struck off level with the upper surface, the exact amount retained in the mold having been predetermined by adjustment of the springs 8. Thereupon, the carriage 21 is additionally rotated to position the filled mold between the platens 23 and 24 and concurrently to position the mold containing a finished block in position for ejection.

It is apparent from the foregoing description that articles of the desired shape, even those with irregular bottom surfaces which prevent their being slid from a platen parallel to the general plane thereof may be made with the present mold and instead of a large number of heavy and expensive pallets being required, a very limited number are sufficient. Though a large number of pallet plates 7 are required, the pallet plates 7 are relatively light and inexpensive and do not impose the economic and physical burdens which would exist were the prior types of one piece pallets used.

Having thus described our invention, we claim:

1. A mold having an open top cavity, a master pallet in the mold cavity and movable toward and away from the open top and arranged to be engaged on the underside by upwardly operating ejecting means for moving the pallet toward said open top, a removable pallet plate having its under face fitting to the contour of the upper face of the master pallet and having its upper face conforming to the surface contour of the bottom of the article to be molded, resilient lost motion separating means extending through the master pallet and operatively engaging the underside of the plate for lifting the plate from the master pallet when the resilient lost motion connection means is compressed and the resistance to lifting action is less than the restoring force of the resilient means, and means adapted to be engaged and operated by the ejecting means when the ejecting means is operated for ejecting the master pallet, to compress said resilient lost motion separating means.

2. A mold having an open top cavity, a master pallet in the mold cavity and movable toward and away from the open top and arranged to be engaged on the underside by upwardly operating ejecting means for moving the pallet toward said open top, a removable pallet plate having its underface adapted to be engaged and supported by the upper face of the master pallet and having its upper face conforming to the surface contour of the bottom of the article to be molded, said master pallet having openings therethrough extending downwardly from the upper face and aligned with part of the ejecting means, resilient lost motion separating means extending downwardly into said openings in the master pallet and operatively engaging the under side of the plate at their upper ends, the lower ends of the resilient lost motion separating means normally extending into position to be engaged and lifted by the ejecting means when the ejecting means is moved upwardly for engaging the master pallet, whereby said resilient lost motion separating means are compressed, and said resilient lost motion separating means being operative when compressed to lift the plate and molded article relative to the pallet when the molded article is partially ejected from the mold by lifting the plate and pallet together.

3. A mold having an open top cavity, a master pallet in the mold cavity and movable toward and away from the open top and arranged to be engaged on the underside by upwardly operating ejecting means for moving the pallet toward said open top, a removable pallet plate having its underface adapted to be engaged and supported by the upper face of the master pallet and having its upper face conforming to the surface contour of the bottom of the article to be molded, resilient lost motion separating means extending downwardly through the master pallet and operatively engaging the underside of the plate at their upper ends, the lower ends of the resilient lost motion separating means normally extending below the level of the underside of the master pallet in position to be engaged and lifted by the ejecting means when the ejecting means is moved upwardly for engaging the master pallet, and means rendered operative when the ejecting means engage the master pallet to prevent further compression of the resilient lost motion separating means by the ejecting means.

4. A mold having an open top cavity, a master pallet in the mold cavity and movable toward and away from the open top and arranged to be engaged on the underside by upwardly operating ejecting means for moving the pallet toward said open top, a removable pallet plate having its underface fitting to the contour of the upper face of the master pallet and having its upper face conforming to the surface contour of the bottom of the article to be molded, resilient lost motion separating means extending through the master pallet and operatively engaging the underside of the plate for lifting the plate from the master pallet when the resilient lost motion separating means is compressed and the resistance to lifting action is less than the restoring force of the resilient means, and means adapted to be engaged and operated by the ejecting means when the ejecting means is operated for ejecting the master pallet, to compress said resilient lost motion separating means, said resilient lost motion separating means being of adequate strength to lift the plate and a molded article formed in the cavity relative to the master pallet when the molded article is clear of the mold and being inadequate to overcome the resisting force of the plate and article while the article is in initial molded position in the cavity.

5. A mold having an open top cavity with substantially parallel planar side walls and parallel planar end walls and a bottom wall, a master pallet normally resting on the bottom wall, a removable pallet plate having its undersurface accurately fitting on the uppersurface of the master pallet, said bottom wall having holes therein to afford passage of upwardly movable ejection pins into engagement with the underside of the master pallet, said master pallet having a plurality of holes therethrough and aligned with certain of the holes of the bottom wall respectively, resilient lost motion separating means in said holes of the master pallet respectively, and engageable at their upper ends with the undersurface of the plate and having their lower ends positioned to be operatively engaged by the ejection pins for compression thereby upon upward movement of the pin.

6. In combination, a mold having an open top cavity, a master pallet in the bottom of the cavity, a removable pallet plate resting on the master pallet, upwardly movable ejection pins, part of said pins being operatively engageable with the underside of the master pallet for lifting it in the cavity, said master pallet having holes therethrough aligned with certain others of the ejecting pins, resilient lost motion separating means in said aligned holes operatively engageable at their upper ends with the underside of the plate, and arranged to be operatively engaged and compressed a predetermined amount by said other pins when the pins move to ejecting position, and said resilient lost motion separating means being operative to transmit substantial lifting force of the said other ejecting pins to the master pallet when the resilient lost motion separating means have been compressed a predetermined amount.

7. In a mold having an open top cavity with relatively fixed side and bottom walls, a rigid master pallet in the cavity and parallel to the bottom wall, closely fitting the side walls of the cavity at its edges, and being movable toward and away from the bottom wall, a pallet plate removably supported on the master pallet and having its undersurface fitting the upper surface of the master pallet, said bottom wall having openings therein for accommodating ejection pins for movement toward and away from the open top of the mold, resilient means of smaller size than said holes and carried by the master pallet and aligned with said holes and extending upwardly through the master pallet and engaging the pallet plate at their upper ends, the resilient means when compressed to the maximum permitted by the master pallet, being insufficient to overcome the resistance of mold walls to movement of the article upwardly in the mold from starting position but sufficient to lift the plate and article from the master pallet when the article is partially ejected from the mold.

8. A mold having an open top cavity, a plate in the cavity and forming the operating bottom molding wall thereof, resilient means yieldably holding the plate above the bottom of the cavity, whereby a definite amount of material to be molded can be measured by filling the cavity with the plate in raised position and striking off the material level with the top of the mold cavity, said resilient means being substantially incompressible by the weight of material and being incapable of lifting the molded article when the article is fully within the mold and being compressible by the molding pressure, and means independent of the resilient means for lifting the plate in the mold with the molded article thereon.

9. A mold having an open top cavity, a pallet in the cavity, a plate in the cavity above the pallet and arranged to seat on the pallet, resilient means operatively interposed between the plate and pallet and normally yieldably supporting the plate in spaced relation above the pallet, said means being operative upon predetermined pressure on the plate to compress sufficiently to permit the plate to seat on the pallet and being operative to support the plate in fully raised position against the weight of moldable material filling the mold above the level of the plate.

10. A mold according to claim 9 and characterized in that said resilient means are adjustable to vary the normal level of the plate above the pallet.

EDWARD A. WOZNUK.
ROBERT J. BRETT.

REFERENCES CITED

The following references are of record in the file of this patent:

UNITED STATES PATENTS

| Number | Name | Date |
|---|---|---|
| 320,541 | Crossley et al. | June 23, 1885 |
| 647,431 | Weil | Apr. 10, 1900 |
| 1,985,115 | Straub | Dec. 18, 1934 |